United States Patent [19]

Bailey

[11] 4,009,727
[45] Mar. 1, 1977

[54] VALVE LINER FOR A KNIFE GATE VALVE
[75] Inventor: Thomas R. Bailey, Tucson, Ariz.
[73] Assignee: Thomas R. Bailey, Phoenix, Ariz.
[22] Filed: Oct. 20, 1975
[21] Appl. No.: 623,800
[52] U.S. Cl. .............................. 137/454.2; 251/326; 251/329
[51] Int. Cl.$^2$ .......................................... F16K 3/02
[58] Field of Search .......... 251/326, 327, 328, 329; 137/454.2, 454.6

[56] References Cited
UNITED STATES PATENTS

| | | | |
|---|---|---|---|
| 2,893,684 | 7/1959 | Williams et al. | 251/329 X |
| 2,942,841 | 6/1960 | Stillwagon | 251/326 X |
| 3,350,058 | 10/1967 | Alden | 251/329 |

Primary Examiner—Arnold Rosenthal

[57] ABSTRACT

A replaceable valve liner for valves of the knife gate type includes a main body liner member of a generally cylindrical configuration adapted to be positioned in the flow passage through the valve and having a circular radially outwardly directed positioning flange at one end adapted to abut one side of the valve housing when so positioned. A removable ring flange is adapted to be positioned on the main body liner member at the opposite end from the positioning flange and is similarly adapted to abut the housing on an opposite side thereof. A slide gate liner member in the configuration of a flattened sleeve has a slot therethrough in which the slide gate of the valve is slideably received. The slide gate liner member has a fragmented circular notch formed in one end so that it can be seated on an outer surface of the main body liner member in alignment with a slot through the main body liner member such that the slide gate can be moved between a closed position in which it blocks the flow passage through the valve and an open position retracted into the slide gate liner member. The valve liner is preferably made of a material such as polyurethane having long-wearing characteristics and having the ability to form fluid-tight seals with the valve and adjacent fluid flow conduits connected to the valve.

7 Claims, 7 Drawing Figures

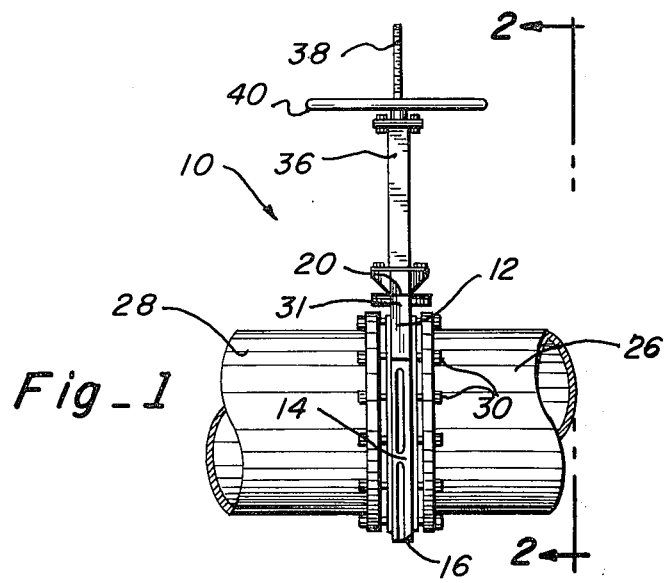
Fig_1
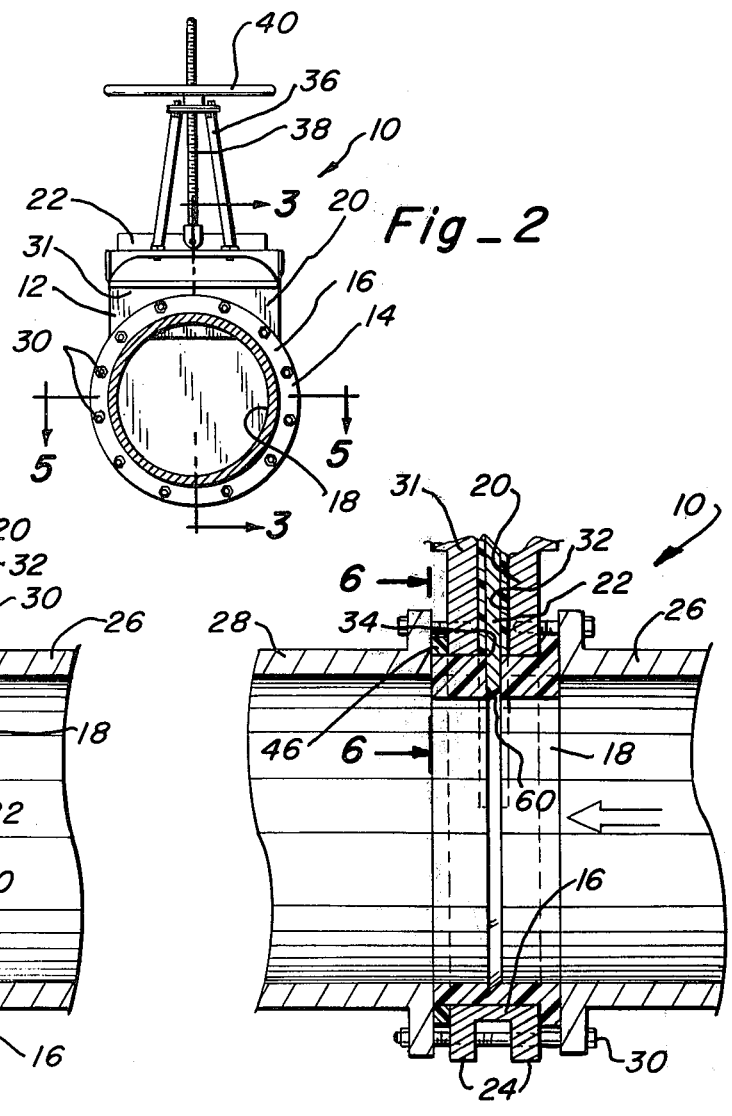
Fig_2
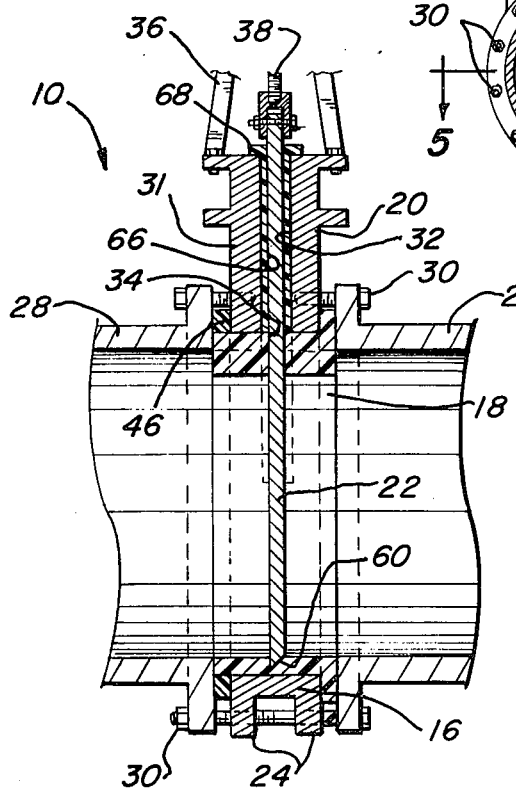
Fig_3
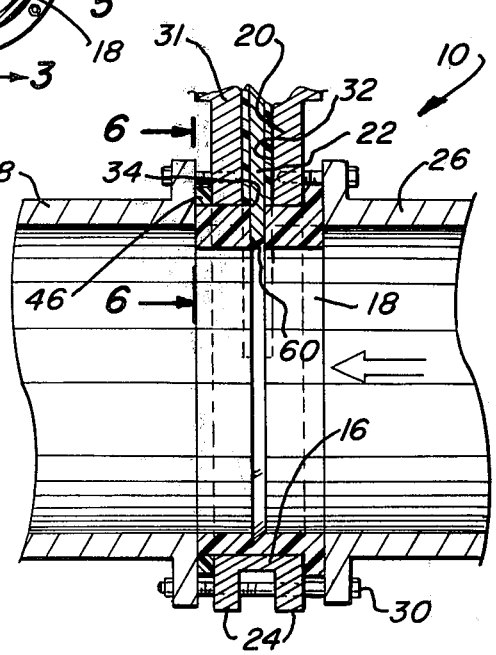
Fig_4

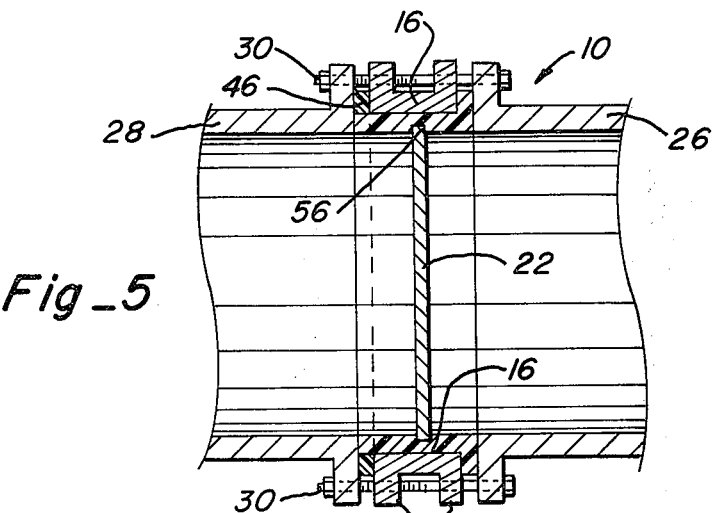
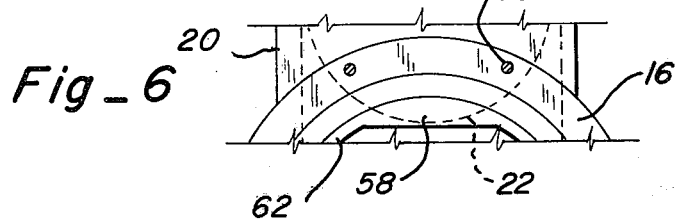
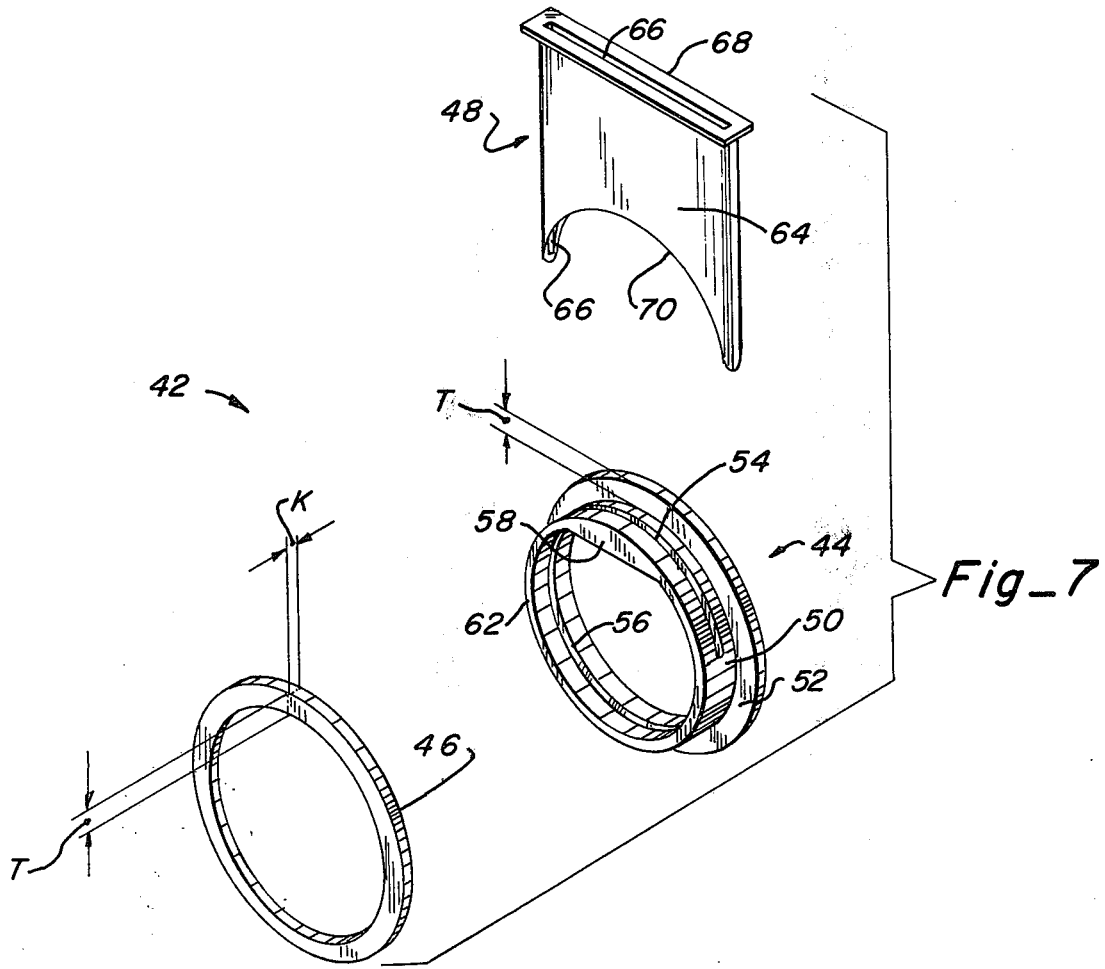

VALVE LINER FOR A KNIFE GATE VALVE

BACKGROUND OF THE INVENTION

The present invention relates generally to valve assemblies and more particularly to a replaceable liner for a knife gate type valve assembly.

In the mining and other industries, knife gate type valves are used to control the flow of fluids and are typically positioned in the flow line between adjacent ends of fluid flow conduits or pipes. The knife gate valves are characterized by a housing defining a circular passage therethrough aligned with the adjacent fluid flow conduits and an upward extension having a slot therein which slidably receives a slide gate. The slide gate is adapted to be moved between a closed position wherein it blocks the passage through the valve and a retracted open position allowing the flow of fluid through the valve. Typically, knife gate valves liners of a stainless steel material which are relatively long-lasting by being resistant to corrosion and erosion by the fluids flowing through the valve. These liners, however, ultimately wear out depending upon the use of the valve and the type of fluids being conducted through the valve.

Prior to the present invention, when a liner became worn to the point where it no longer served the purpose for which it was intended, the valve would either have to be replaced by a new valve or the stainless steel liner removed by a very expensive process and replaced with a new stainless steel liner. Knife gate valves depending upon their size and intended use can be very expensive and have been relatively large expense factors in the maintenance of certain operations such as in the mining industry.

Accordingly, there has long been a need for a system of maintaining knife gate valves in good working condition in a relatively inexpensive and maintenance free manner. The present invention is intended to satisfy this need.

OBJECTS OF THE INVENTION

It is a primary object of the present invention to provide a new and improved system for maintaining knife gate valves in proper working condition in both an efficient and economical manner.

It is another object of the present invention to provide a readily replaceable linear assembly for use in valve assemblies so that worn liners can be removed and replaced in a quick and efficient manner.

It is another object of the present invention to provide a new and improved liner assembly for knife gate valves which is inexpensive in construction and which can be substituted for a worn liner in a quick manner at low labor costs.

It is another object of the present invention to provide a replaceable liner assembly for a knife gate valve including a main body liner member adapted to be positioned in the flow passage through the knife gate valve, positioning means for retaining the position of the main liner member in fluid-tight sealed relationship with the valve and a slide gate liner member establishing a fluid-tight seal with the slide gate of the valve and the main body liner member.

SUMMARY OF THE INVENTION

The valve liner of the present invention consists of three component parts which cooperate with each other in protecting a knife gate valve assembly or the like from fluids flowing therethrough.

A main body liner member is of generally cylindrical configuration so as to fit snuggly into the flow opening or passage defined within the housing of a knife gate valve and includes a radially outwardly extending flange along one end adapted to abut against one side of the housing of the valve to separate the valve from the end of the fluid flow conduit which may be connected thereto. A removable flange ring is adapted to be mounted on the opposite end of the main body linear member to separate the opposite side of the valve housing from a second fluid flow conduit. The main body liner member and flange ring thereby cooperate in establising a fluid-tight seal between the housing and the conduits which may be connected thereto and further, the main body liner member establishes a long-wearing surface which is exposed to fluid flowing through the valve to protect the housing from erosive or corrosive damage which can be caused by the fluids flowing through the valve.

A slide gate liner member is positionable within a slot in the housing of the valve in which the slide or knife gate of the valve is disposed. The slide gate liner member consists generally of a flattened sleeve defining a slotted interior opening in which the slide gate is slideably disposed in fluid-tight relationship with the slide gate liner member.

The main body liner member has a slot through which the slide gate is adapted to move between a closed position in which it blocks the passage through the valve and a retracted open position leaving the valve open for the free flow of fluids therethrough.

Other objects, advantages and capabilities of the present invention will become more apparent as the description proceeds taken in conjunction with the accompanying drawings.

BRIEF DESCRIPTION OF THE DRAWINGS

FIG. 1 is a side elevational view of a knife gate valve assembly with the liner of the present invention positioned therein and with a pair of fluid flow conduits connected thereto extending in opposite axial directions.

FIG. 2 is a section taken along Line 2—2 of FIG. 1.

FIG. 3 is an enlarged fragmentary section taken along Line 3—3 of FIG. 2 showing the knife gate in a closed position.

FIG. 4 is an enlarged fragmentary sectional view similar to FIG. 3 showing the knife gate in a retracted open position.

FIG. 5 is an enlarged section taken along Line 5—5 of FIG. 2

FIG. 6 is a section taken along Line 6—6 of FIG. 4.

FIG. 7 is an exploded perspective view of the liner of the present invention showing the three component parts thereof.

DESCRIPTION OF A PREFERRED EMBODIMENT

Referring first to FIGS. 1 and 2, a conventional knife gate valve assembly 10 of the type conventionally used in the mining industry to control the flow of slurries through interconnected conduits is illustrated. The valve assembly 10 can be seen to include an outer housing 12 having a main body portion 14 formed by an outwardly opening channel member 16 shaped into a circle to define a passage 18 therethrough and an upwardly extending neck portion 20 slideably receiving a slide or knife gate 22 adapted to open and close the passage 18 through the valve. As best seen in FIGS. 2 through 5, the channel member 16 circumscribing the passage through the main body of the valve has a pair of parallel radially outwardly extending ribs 24 which have a plurality of circumferentially spaced openings (not seen) therethrough defining locations at which fluid flow conduits 26 and 28 can be connected to the valve by conventional fasteners 30 so that the valve is positively positioned and maintained in the fluid flow path of liquid transmitted through the conduits.

Referring more particularly to the neck portion 20 of the valve, it can be seen to include a generally flat vertical base 31 forming an upward extension from the main body 14 of the valve 10 and having an elongated slot 32 therethrough aligned with a slot 34 in the upper portion of the main body for slideably receiving the slide gate 22. Extending upwardly from the base 31 of the neck 20, is a support assembly 36 for a lift mechanism operably connected to the slide gate to move the gate between open and closed positions. In the disclosed valve, the lift mechanism is in the form of a threaded rod 38 and a screw wheel 40 threadedly receiving the rod to effect axial movement of the rod upon rotation of the wheel.

Referring now to FIG. 7, the valve liner 42 of the present invention, which is adapted to be inserted into the abovedescribed valve 10, is shown. As can be seen, the valve liner 42 includes a main body liner member 44, a flange ring 46, and a slide gate liner member 48.

The main body liner member 44 includes a generally cylindrical body 50 having an integral radially outwardly directed flange 52 at one end. At approximately mid-length of the body 50, a transversely extending slot 54 is provided to be aligned with the slot 32 through the neck portion 20 of the valve and is of a width to allow sliding movement of the slide plate 22 therethrough. In circumferential alignment with the slot 54, a groove 56 is provided in the inner surface of the cylindrical body to receive the slide gate when it is in a closed position as will be described more clearly later. The body of the main body liner member has an inward extension or thickened portion 58 along the top thereof which extends axially of the body 50 and is centered relative to the slot 54 in the body. The inward extension or thickened portion, as will become more clear later, serves to protect the leading edge 60 of the slide gate from fluid flow in most knife gate valve assemblies.

The flange ring 46 is of circular configuration and has an inner diameter substantially the same as the outer diameter of the body 50 of the main body liner member 44 so that it can be slid onto the opposite end 62 of the body from the integral flange 52. The inner diameter of the flange ring 46 and the outer diameter of the body should be such that a relatively tight fit exists when the flange ring is mounted on the body for reasons which will become more clear later. The radial thickness T of the flange ring is the same as the radial thickness T of the integral flange 52 so that when the flange ring is mounted on the main body liner member, the flange ring and the integral flange extend radially outwardly from the body of the main body liner member the same distance.

The slide gate liner member 48 consists of a generally flat sleeve 64 having an external size and configuration substantially the same as the slot 32 extending through the base 31 of the neck portion 20 of the valve. A slot of passage 66 extends through the slide gate liner member and is substantially equal in width, depth and configuration to the slide gate 22 so that the slide gate can be slid therethrough in fluid-tight sealed relationship with the liner 48. An outwardly directed flange 68 extends around the upper edge of the slide gate liner member and is adapted to seat on the upper end of the base 31 of the neck portion 20 of the valve assembly when the slide gate liner member is positioned therein. The lower edge of the slide gate liner member is in the form of a fragmented circular arc 70 forming substantially a semicircle the radius of which is the same as the radius of the external surface of the body 50 of the main body line member 44. In this manner, the slide gate liner member can be seated on top of the main body liner member in vertical alignment with the slot 54 through the main body liner member and will mate with the outer surface of the body of the main body liner member.

In the preferred embodiment, each of the valve liner components 44, 46 and 48 is made of a polurethane material having a good resistance to corrosion and erosion by fluids of the type which would be passed through the valve so that the liner had a resonably long life. Further, the polyrethane material should be such that a good fluid-tight seal is established between the valve and the adjacent conduits 26 and 28 to which it is attached and between the slide gate 22 and the liner components. A material which has been found effective for this purpose is a polyurethane elastermic of the type marketed under the mark "Adiprene" by E. D. DuPont deNemours & Company of Wilmington, Delaware.

The liner assembly 42 is positioned in the valve 10 when the valve is separated from the fluid flow conduits 26 and 28. As will be appreciated, the separation of the valve from the conduits is a very simple matter in that only the fasteners 30 connecting the conduits to the valve need be removed. In mounting the liner assembly in the valve, the main body liner member 44 is first inserted into the circular passage 18 through the valve housing until the integral flange 52 on the liner member abuts one side of the housing 12. The opposite end 62 of the cylindrical main body liner member will then protrude from the opposite side of the housing a distance which is substantially the same as the axial thickness K of the flange ring 46. The flange ring is then slid onto the main body liner member to assume the position shown in FIGS. 3 through 5 wherein it defines an outward radial extension from the opposite end 62 of the main body liner member from the integral flange 52. The slide gate liner member 48 is then inserted downwardly into the slotted opening 32 in the neck 20 of the valve until the flange 68 at the top of the liner member 48 abuts the top surface of the neck. At that location, the fragmented circular arc 70 formed in the lower end of the slide gate liner member is seated on the outer surface of the main body liner member in alignment with the slot 54 through the main body liner member.

The slide gate 22, which normally must be removed to insert the slide gate liner member is then remounted and inserted into the slide gate liner member so that it is disposed for sliding movement through the slide gate liner member and the slot 54 in the upper surface of the main body liner member. The sliding fit of the slide gate through the liner members is such that a fluid-tight seal is effected whereby no fluid is allowed to flow upwardly between the slide gate and the surrounding liner members. It should also be noted that the circular groove 56 provided in the inner surface of the main body liner member 44 is in alignment with the slide gate so that when the gate is in the closed position of FIG. 3, the edge of the gate is received in this circular groove in fluid-tight sealed relationship with the main body liner member to prevent the leakage of fluid past the gate.

After the liner assembly 42 has been mounted in the valve 10 as described, the fluid flow conduits 26 and 28 are again connected to opposite sides of the valve with the fasteners as previously described and it will be appreciated that the main body liner member with the integral flange 52 on one end and the flange ring 46 on the other establishes a fluid-tight seal between the fluid flow conduits 26 and 28 and the valve 10 so that no leakage is allowed at the connection locations.

In most knife gate valves, the knife gate in its fully retracted position still protrudes a slight distance into the circular passage 18 through the valve. When the liner of the present invention is used in such a valve, however, the thickened portion of the main body liner member extends down beyond the lower edge of the slide gate, as can be seen in FIG. 4, so that the lower edge of the gate does not get damaged by fluids flowing through the valve.

Although the present invention has been described with a certain degree of particularity, it is understood that the present disclosure has been made by way of example and that changes in details of structure may be made without departing from the spirit thereof.

What is claimed is:

1. In a flow through valve assembly having a housing defining an opening through which fluid flow is selectively controlled by a slide gate adapted to be slid transversely of said opening through a slot in said housing, the improvement comprising a removable liner including:
   a main body liner member having a cylindrical member conforming in external size and configuration to the size and configuration of the opening in said housing, an integral radially outwardly directed flange along one end of the cylindrical member, and a removable flange ring projecting radially outwardly from the opposite end of the cylindrical member, said main body liner member being received in said opening to separate the housing from fluid flowing through said valve assembly, and a slot through the cylindrical member aligned with the slot in the housing to allow sliding movement of said gate therethrough, and
   a slide gate liner member positioned in the slot in said housing, said slide gate liner member having a slot therethrough slideably receiving said slide gate and an edge conforming in size and configuration to the external size and configuration of the cylindrical member at the location where said slot through the cylindrical member is located to allow continuous engagement of the liner members at this location, said slots in the liner members being aligned to allow selective sliding movement of the slide gate through said members.

2. The valve assembly of claim 1 wherein said slide gate liner member consists of a flattened sleeve defining a slot therethrough, and wherein the end of said sleeve which engages the main body liner member has a fragmented circular notch which conforms to the external configuration of the cylindrical member.

3. The valve assembly of claim 1 wherein said main body liner member and slide gate liner member are made of a polyurethane material.

4. The valve assembly of claim 1 wherein said housing includes connection means for connecting the valve assembly to an end of a conduit of circular cross-section, wherein the slide gate is at least partially axially aligned with a conduit connected to the housing when the gate is in an open position, and wherein said main body liner member includes a radially inward extension at the location of said slot therein to at least partially surround the portion of said gate which is aligned with a conduit connected to the housing to protect said portion from fluids flowing through the valve.

5. In a flow-through valve assembly having a housing defining a opening through which fluid flow is selectively controlled by a slide gate adapted to be slid transversely of said opening through a slot in said housing, wherein said housing includes connection means for connecting the valve assembly to the end of a fluid flow conduit, the improvement comprising a removable liner including a main body liner member conforming in external size and configuration to the size and configuration of an opening in said housing, said main body liner member being received in said opening to separate the housing from fluid flowing through said valve assembly, said main body liner member extending between said housing and conduit to establish a fluid-tight seal between the housing and conduit, positioning means on said main body liner member for maintaining the position of the main body liner member in the housing, and a slot through the main body liner member aligned with the slot in the housing to allow sliding movement of said gate therethrough, and a slide gate liner member positioned in the slot in said housing, said slide gate liner member having a slot therethrough slideably receiving said slide gate, and an edge conforming in size and configuration to the external size and configuration of the main body liner member at the location where said slot through the main body liner member is located to allow continuous engagement of the liner members at this location, said slot in the liner member being aligned to allow selective sliding movement of the slide gate through said members.

6. The valve assembly of claim 5, further including a flange ring forming a fluid-tight seal with the main body liner member and being positioned to extend around the main body liner member so as to abut an opposite side of the housing from said first mentioned flange.

7. A valve liner for a valve assembly wherein said valve assembly includes a housing defining a circular opening therethrough and a slide gate slideable in a slot in said housing transversely of said opening to selectively open and close the opening, said valve liner including:
   a generally cylindrical main body liner member conforming in external size to the size of said circular opening so as to be positionable in said circular opening, said main body liner member having a circular radially outwardly directed flange on one end adapted to abut a side of said housing when the main body liner member is positioned in said housing, said main body liner member including a slot therein alignable with the slot in the housing of the valve whereby the slide gate can be slid therethrough,
   a flange ring adapted to be removably positioned on the opposite end of said main body liner member from said first mentioned flange, said flange ring when mounted on said main body liner member forming a radially outward extension from the main body liner member adapted to abut an opposite side of said housing from said first mentioned flange, and a slide gate liner member adapted to be positioned in the slot in said housing, said slide gate liner member consisting of a flattened sleeve defining a slot therethrough in which said slide gate can be slideably received and having a fragmented circular notch formed in one end adapted to be seated on the main body liner member such that the slot in the slide gate liner member is aligned with the slot in the main body liner member.

* * * * *

UNITED STATES PATENT AND TRADEMARK OFFICE
CERTIFICATE OF CORRECTION

PATENT NO. : 4,009,727
DATED : March 1, 1977
INVENTOR(S) : Thomas R. Bailey

It is certified that error appears in the above—identified patent and that said Letters Patent are hereby corrected as shown below:

Page 1, column 1, the designated Assignee should be
-- Colorado Mart Industries, Inc., Arvada, Colorado --
rather than "Thomas R. Bailey, Phoenix, Arizona".

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*